United States Patent [19]
DiGiovanni et al.

[11] Patent Number: 5,731,892
[45] Date of Patent: Mar. 24, 1998

[54] ARTICLE COMPRISING HYBRID OPTICAL FIBER AMPLIFIER

[75] Inventors: David John DiGiovanni, Montclair; Namkyoo Park, Basking Ridge; Kim Willard Womack, New Providence; Paul Francis Wysocki, Scotch Plains, all of N.J.

[73] Assignee: Lucent Technologies Inc., Murray Hill, N.J.

[21] Appl. No.: 847,766

[22] Filed: Apr. 22, 1997

Related U.S. Application Data

[63] Continuation of Ser. No. 635,833, Apr. 22, 1996, abandoned.
[51] Int. Cl.$^6$ .................... H01S 3/13; G02B 6/00
[52] U.S. Cl. .................... 359/341; 359/177; 372/6
[58] Field of Search .................... 359/174, 177, 359/179, 341; 372/6

[56] References Cited

U.S. PATENT DOCUMENTS

| | | | |
|---|---|---|---|
| 5,050,949 | 9/1991 | DiGiovanni et al. | 359/341 |
| 5,111,334 | 5/1992 | Heickmann | 359/341 |
| 5,225,925 | 7/1993 | Grubb et al. | 359/343 |
| 5,234,104 | 8/1993 | Delavaux | 359/174 |
| 5,532,862 | 7/1996 | Abxarder et al. | 359/174 |
| 5,532,870 | 7/1996 | Shigemutsu et al. | 359/341 |
| 5,594,747 | 1/1997 | Ball | 372/31 |

OTHER PUBLICATIONS

"Gain–flattened Optical–fiber Amplifiers with a Hybrid Er–doped fiber Configuration for WDM Transmission," by T. Kashiwada et al., *Proceedings of OFC 1995*, paper TuP1, pp. 77–78.

"Four Channel 2.5 Gbit/s WDM Transmission Over 509 km Using Gain–Flattened Hybrid In–line EDFAs," by K. Nakazato et al., *Proceedings of ECOC 1995*, paper Th.L.1.4, pp. 925–928.

"$Yb^{3+}$ Sensitised $Er^{3+}$ Doped Silica Optical Fibre With Ultrahigh Transfer Efficiency and Gain", by J. E. Townsend et al., *Electronics Letters*, vol. 27, No. 21, 10th Oct. 1991.

"Ultrahigh Power Diode–pumped 1.5–μm Fiber Amplifiers,", by S. G. Grubb et al., *Proceedings of OFC*, paper TuG4, pp. 30–31.

Wysocki et al, OFC '96, Mar. 1, 1996, vol. 2, pp. 32–33; abst. only herewith.

Barnes et al, Jour. of Lightwave Techn., vol. 7, #10, Oct. 1989; pp. 1461–1465.

Park et al, Feb. 25, 1996; Opt. Fiber Communications, vol. 2, pp. 280–281; abst only herewith.

Sugaya et al, OAA '95, paper FC3, Jun. 16, 1995, Davos, Switzerland, 4 pgs.

Delavaux et al, Electronics Letters, vol. 28, #17, Aug. 13, 1992, pp. 1642–1643.

Gills et al, IEEE Photonics Tech. Letters, #2, Dec. 1990, 866–868.

*Primary Examiner*—Nelson Moskowitz
*Attorney, Agent, or Firm*—Eugen E. Pacher

[57] ABSTRACT

Multistage Er-doped fiber amplifiers (EDFAs) are disclosed. They comprise a first stage that comprises Er and Al, and further comprise a second stage that comprises Er and a further rare earth element, exemplary Yb. Such multistage EDFAs can have advantageous characteristics e.g., a relatively wide flat gain region (e.g. 1544–1562 nm), and relatively high output power, without significant degradation of the noise figure. Exemplary, the amplifiers are used in WDM systems and in analog CATV systems.

2 Claims, 6 Drawing Sheets

ARTICLE COMPRISING HYBRID OPTICAL FIBER AMPLIFIER

This application is a continuation of application Ser. No. 08/635,833, filed on Apr. 22, 1996, now abandoned.

FIELD OF THE INVENTION

This invention pertains to Er-doped optical fiber amplifiers, and to optical fiber communication systems that comprise such fiber amplifiers.

BACKGROUND OF THE INVENTION

Er-doped fiber amplifiers (EDFAs) are well known, as are optical fiber communication systems that comprise one or more EDFAs. Herein we refer to the amplifier as well as to the systems that comprise one or more amplifiers as "articles" that comprise an amplifier.

As optical fiber communication systems are being considered for demanding new applications such as wavelength division multiplexed (WDM) systems and analog CATV systems, it is becoming apparent that single stage EDFAs will frequently not be able to provide the required performance characteristics. Exemplarily, a single stage EDFA will frequently not be able to deliver the required high output power and spectral gain flatness. By a "single stage" EDFA we mean an EDFA containing a length of a single Er-doped fiber (EDF) of longitudinally essentially constant composition, and by a "multistage" EDFA we mean an EDFA having two or more serially connected non-identical EDFs. The latter may also be referred to as a "hybrid" multistage EDFA.

Recently a hybrid fiber amplifier has been disclosed. See European patent application 0654872A, which is based on Japanese patent application JP 93293440. See also T. Kashiwada et al., *Proceedings of OFC* 1995, paper Tu P1, pp. 77–78; and K. Nakazato et al., *Proceedings of ECOC* 1995, paper Th.L.1.4, pp. 925–928, all incorporated herein by reference.

The European patent application discloses a fiber amplifier that contains at least two kinds of serially coupled rare earth doped optical fibers. The rare earth element present in both kinds of fibers preferably is Er, and the serially coupled fibers differ with regard to $Al_2O_3$ concentration, $P_2O_5$ concentration, Er doping concentration, or a combination of these. The first (input) stage of the prior art hybrid EDFA typically is an EDF codoped with Al, and the second (output) stage typically is an EDF codoped with P and Al. Both stages typically are pumped with radiation of the same wavelength. Exemplarily, the above referenced ECOC '95 paper discloses the results of a WDM experiment with four channels (1548, 1552, 1555 and 1558 nm). Average gain of the prior art 2-stage EDFA was reported to be 26 dB, with maximum gain difference among the 4 channels said to have been 0.3 dB. Total output power of 10 dBm, and noise figure (NF) ≦6.8 dB were reported.

In view of the importance of EDFAs for optical fiber communication systems, it would be highly desirable to have available multistage EDFAs capable of providing, e.g., high output power and spectral gain flatness, as well as low noise. This application discloses such EDFAs.

Amplifiers that use EDFs codoped with P and Yb are known. See, for instance, J. Townsend et al., *Electronics Letters*, Vol. 27, p. 1958 (1991), and S. Grubb et al., *Proceedings of OFC '96*, paper TUG4, p. 30, both incorporated herein by reference. An Er- and Yb-doped optical amplifier fiber is frequently referred to as an "EYDFA".

SUMMARY OF THE INVENTION

In a broad aspect the invention is embodied in a novel multistage EDFA, and in an optical fiber communication system that comprises the EDFA.

More specifically, the EDFA comprises an input stage and an output stage serially coupled to the former. The input stage comprises a first silica-based (i.e., more than 50 atomic % $SiO_2$) EDF doped with Al, and the output stage comprises a second silica-based EDF. The EDFA furthermore comprises means for providing pump radiation to the first and second EDFs.

Significantly, the second EDF further comprises at least one rare earth (atomic number 57–71) element other than Er, preferably selected from the group consisting of Lu, Ce, La, Gd, Eu and Yb, most preferably Yb. The concentration of the further rare earth element typically is greater (frequently at least 5 times greater) than the Er concentration in the second EDF. The second EDF optionally also comprises Al and/or P.

If the second EDF contains Yb then the means for providing pump radiation to the second EDF advantageously are adapted for providing radiation in the wavelength range 900–1100 nm (e.g., 1064 nm). On the other hand, if the second EDF contains a rare earth element other than Yb (e.g., Lu) then the means for providing pump radiation to the second EDF typically will be adapted for providing radiation in the range 950–1000 nm, or 1450–1500 nm. In both cases, the means adapted for providing pump radiation to the first EDF will be adapted for providing radiation in the wavelength range 950–1000 nm (e.g., 980 nm) or for providing radiation in the range 1450–1500 nm (e.g., 1480 nm). The first and second EDFs and the pump radiations are typically selected such that the multistage EDFA has substantially flat gain (e.g., gain variation at most about 1 dB) over a spectral region that extends over at least 15 nm. In some preferred embodiments that spectral region extends to wavelengths above 1560 nm, thereby meeting a current requirement for at least some WDM systems.

We have discovered that multistage EDFAs according to the invention can be designed to have a wider flat gain region (e.g., 1544 to 1562 nm) than typically is obtained with prior art multistage EDFAs. Furthermore, EDFAs according to the invention can be designed to provide higher output power, without significant degradation of the noise figure, than prior art multistage EDFAs. Indeed, a multistage EDFA according to the invention, with an EDF co-doped with Yb (and P for enhanced power conversion) in the output stage, can have substantially higher output power (e.g., >4W) than a corresponding Yb—free EDFA (typically having at most about 300 mW output power).

Furthermore, we have found that the flat gain region of a 2-stage EDFA with P-doped output stage is not much wider than that of a corresponding P-free EDFA, and in both cases does not extend above 1560 nm, whereas a 2-stage EDFA according to the invention, with Yb-doped second EDF, can have a wider flat gain region than the prior art EDFA with P-doped output stage, with the flat gain region extending above 1560 nm. The relatively wide flat gain region of the Yb-containing multistage EDFA according to the invention is obtained despite the fact that the gain of Er- and Yb-doped fiber is not flat over the wavelength region of interest.

The advantageous properties attainable in multistage EDFAs according to the invention are believed to be a consequence of the presence of a relatively high concentration of a non-Er rare earth (exemplarily Yb) in the second EDF. It should be noted that substitution of another non-Er rare earth (e.g., Lu) for Yb can provide similar advantageous properties.

A further advantage that can be provided by a multistage EDFA according to the invention is suppression of amplifier gain for wavelengths less than about 1540 nm. This is desirable because gain in this wavelength range can increase amplified spontaneous emission (ASE) radiation, resulting in increased noise figure (NF) of the amplifier, and/or in reduced power output. Those skilled in the art will know that in prior art communication systems with EDFAs, ASE with $\lambda<1540$ nm frequently requires suppression using appropriate filters.

Still furthermore, we have found that Yb-containing multistage EDFAs according to the invention can have low NF despite the fact that the NF of Er- and Yb-doped fiber is not particularly low. This advantageous result is a consequence of the fact that the NF of a multistage amplifier is substantially determined by the NF of the input stage.

In summary, multistage EDFAs according to the invention can have a relatively low NF, a relatively flat gain spectrum that can extend above 1560 nm, and can (at least in some embodiments, e.g., embodiments with Yb-doped second fiber that are pumped at about 1064 nm) have high output power. Other embodiments, e.g., those with Lu-doped second fiber, can have similarly low NF and flat gain spectrum, but typically have lower output power, due to the unavailability of a convenient very high power pump radiation source in the relevant wavelength range (exemplarily 950–1010 nm). However, the latter embodiments can conveniently use known semiconductor laser diodes as pump sources in both stages, and this is considered to be a significant advantage in at least some applications.

Use of multistage EDFAs according to the invention in optical fiber communication systems (e.g., WDM or analog CATV) is contemplated. On the other hand, multistage EDFAs according to the invention, with or without pump radiation sources, and with or without conventional components such as filters and isolators, are also likely to become themselves articles of commerce.

DETAILED DESCRIPTION OF SOME EXEMPLARY EMBODIMENTS

The fibers used in the practice of the invention typically are silica-based fibers with germanium- and Er-doped core surrounded by a pure silica or F-doped silica cladding. The core furthermore typically contains Al, and in the second amplifier fiber contains Yb or other rare earth element, and optionally contains P. Techniques for making such fibers are well known and do not require recitation. Exemplarily, the input stage (first) fiber contained about 150 molar ppm (parts per million) Er ions/Si ions, 6.4 molar % Al, had N.A. (numerical aperture) of 0.3 produced by Ge-doping of the core, and cut-off wavelength of about 830 nm, and the output stage (second) fiber had about 1400 molar ppm Er ions/Si ions, 8 molar % P, 2 molar % Al, 2 molar % Ge, and 14 times as much Yb as Er, all concentrations pertaining to the fiber core.

Figure 1:
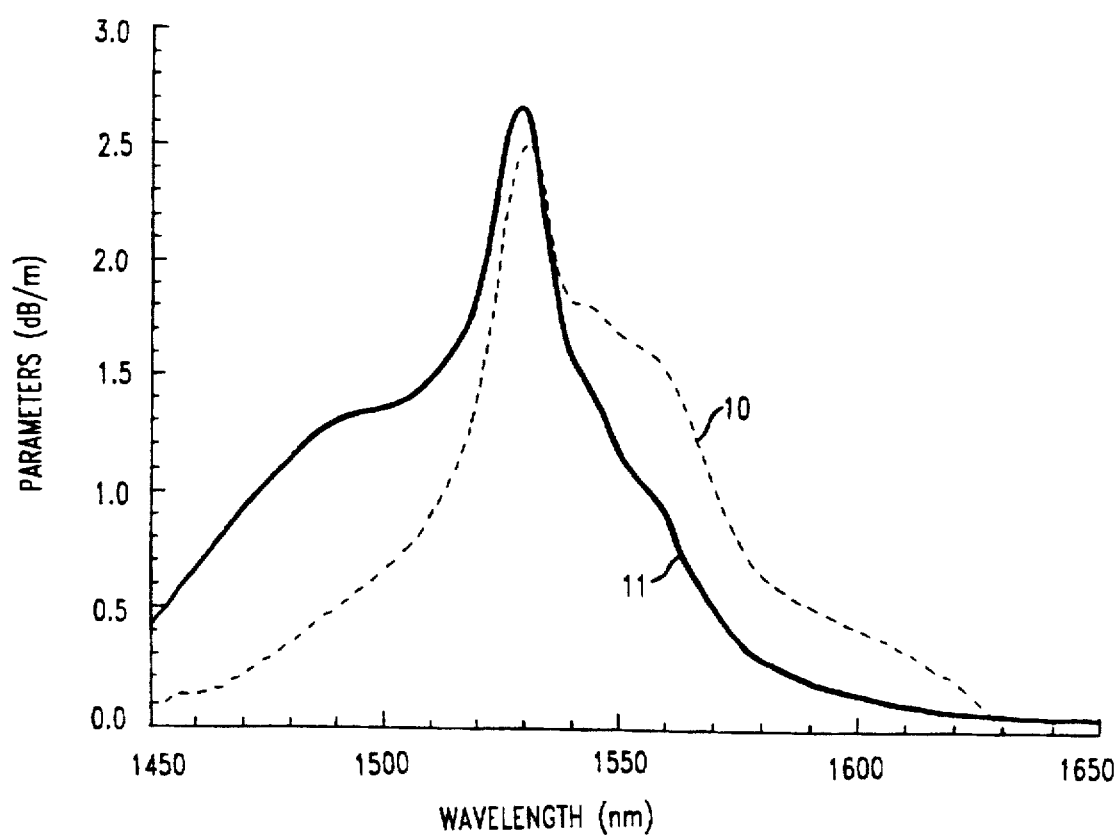
FIGS. 1 and 2 show unpumped loss and fully inverted gain spectra for exemplary EDFs.
Figure 2:
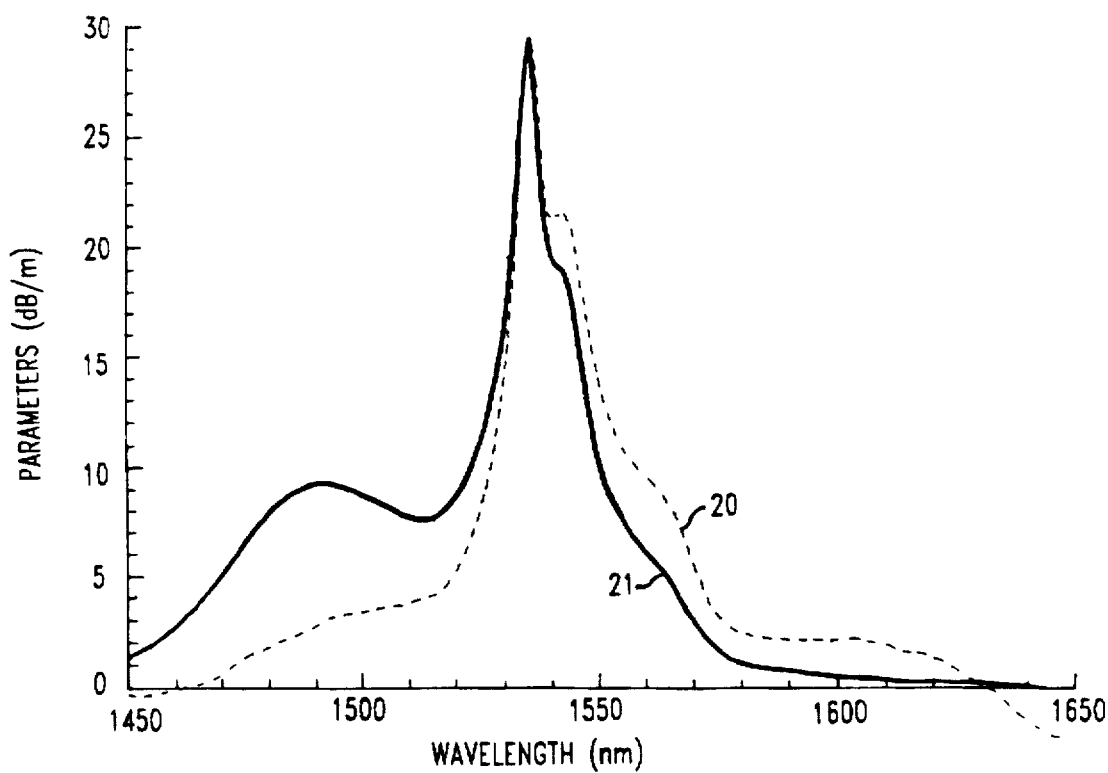

FIGS. 1 and 2 show the measured gain (when all Er-ions are inverted) (10, 20) and loss (when all Er-ions are uninverted) (11,21) for the above described first and second fibers, respectively.

Figure 3:
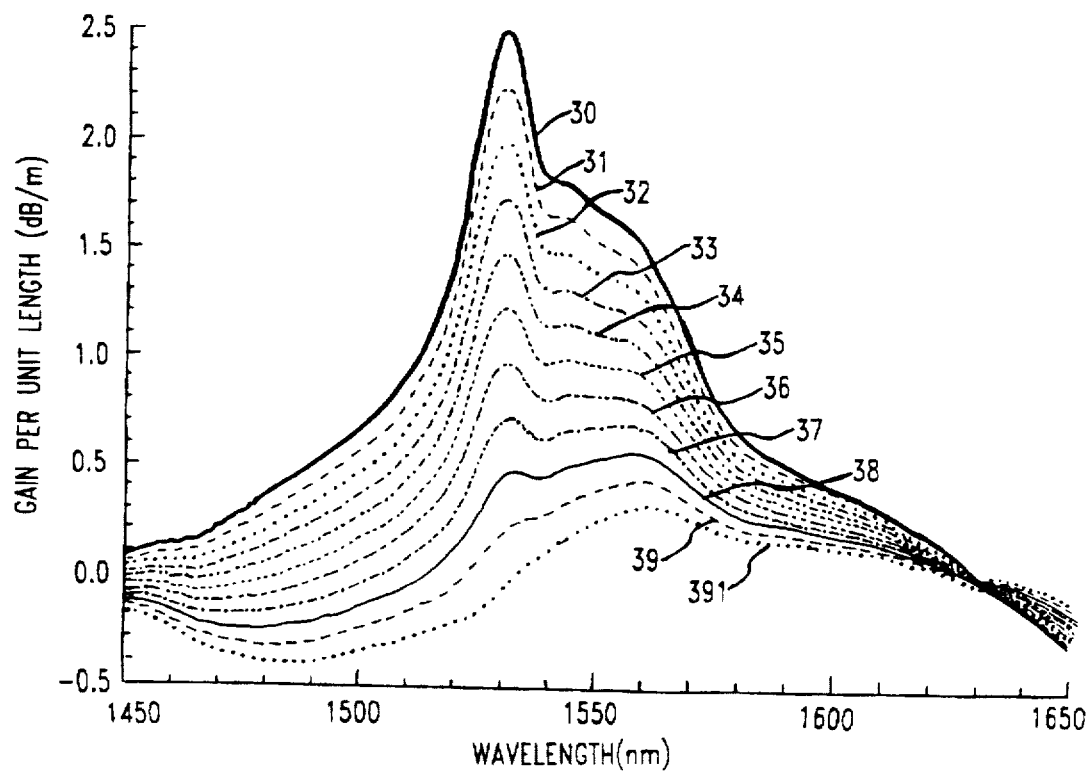
FIGS. 3 and 4 show calculated gain spectra as a function of degree of inversion.
Figure 4:
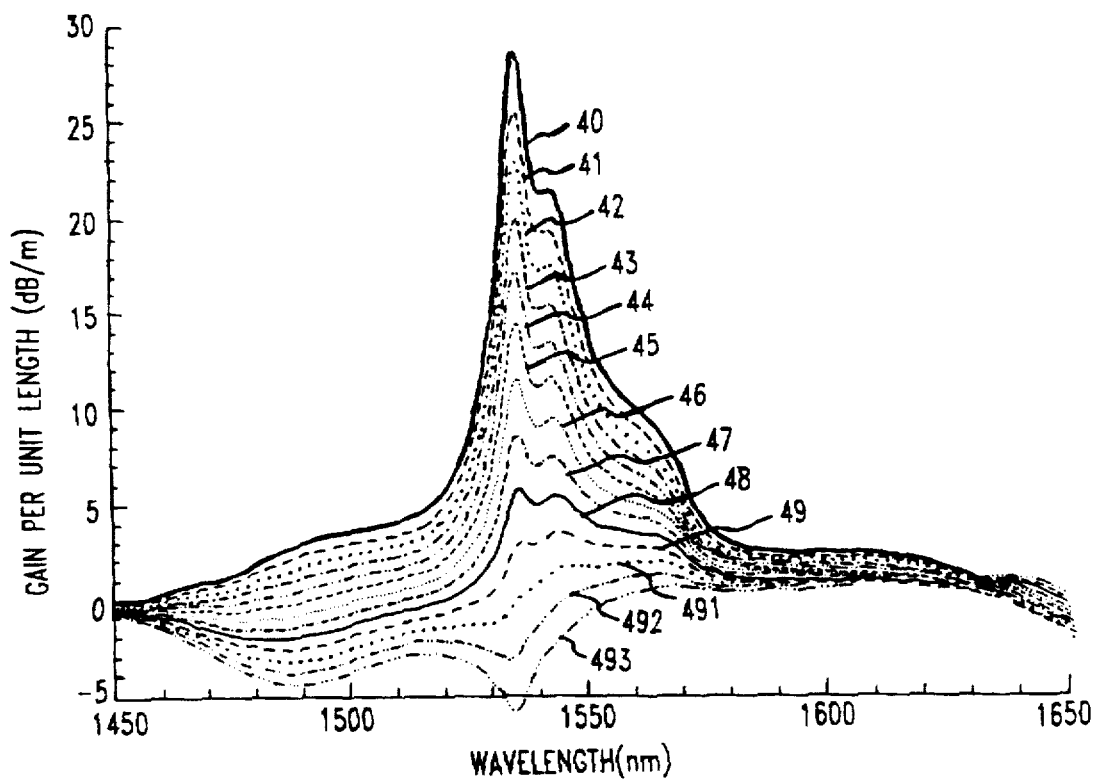

FIGS. 3 and 4 show calculated gain per unit length as a function of wavelength for the above described first and second fibers, respectively. In FIG. 3, numerals 30–39, 391 refer to gain spectra for 100, 95, 90, 85, 80, 75, 70, 65, 60, 55 and 50% inversion, respectively. In FIG. 4, numerals 40–49, 491–493 refer to gain spectra for 100, 95, 90, 85, 80, 75, 70, 65, 60, 55, 50, 45 and 40% inversion, respectively. As can be easily recognized, the first fiber has a somewhat flatter gain spectrum than the second, but neither fiber by itself is adequate for some demanding applications, e.g., analog CATV.

Figure 5:
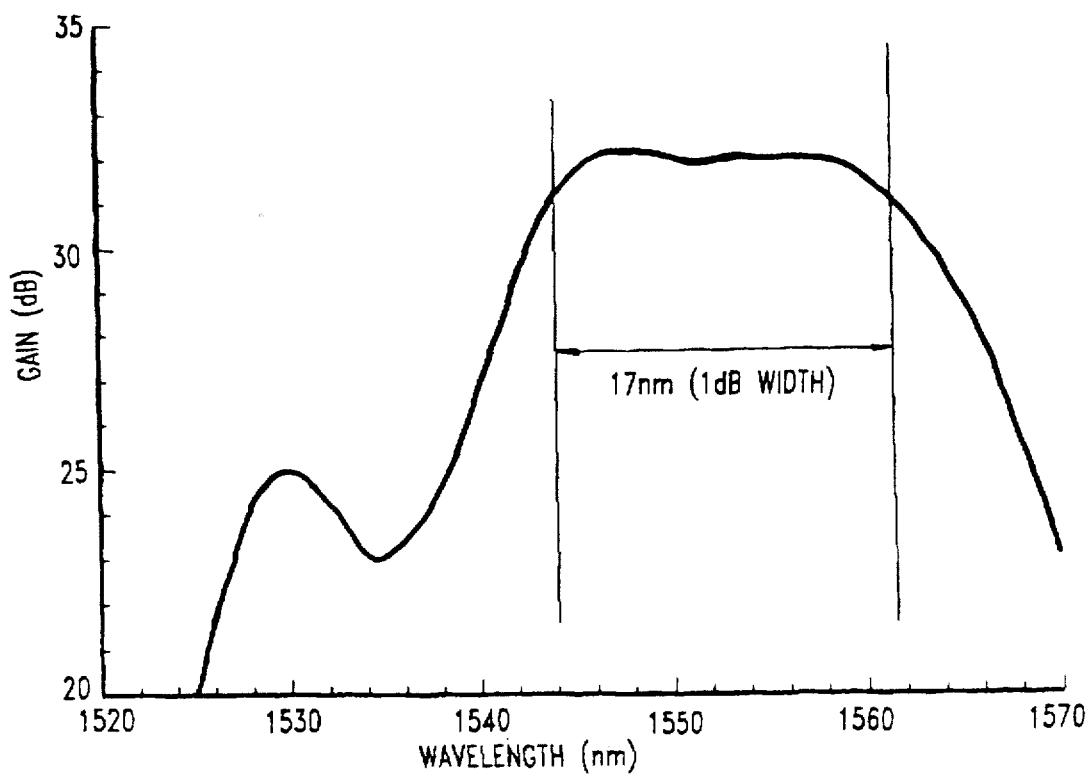
FIG. 5 shows the gain spectrum of an exemplary 2-stage EDFA according to the invention.

FIG. 5 shows the computed gain spectrum of 15 m of the first fiber (100% inversion) series-connected to 6m of the second fiber (47% inversion). The gain spectrum of the combination is substantially flat (±0.5 dB) over a wavelength range of about 17 nm, with a gain of about 32 dB. To achieve the same flat gain spectrum at a different gain, both fibers could be shortened or lengthened by the same percentage. For instance, 10 m and 4 m of the respective fibers (with same inversions) would produce 22 dB of gain, substantially flat over a 17 nm range.

Figure 7:
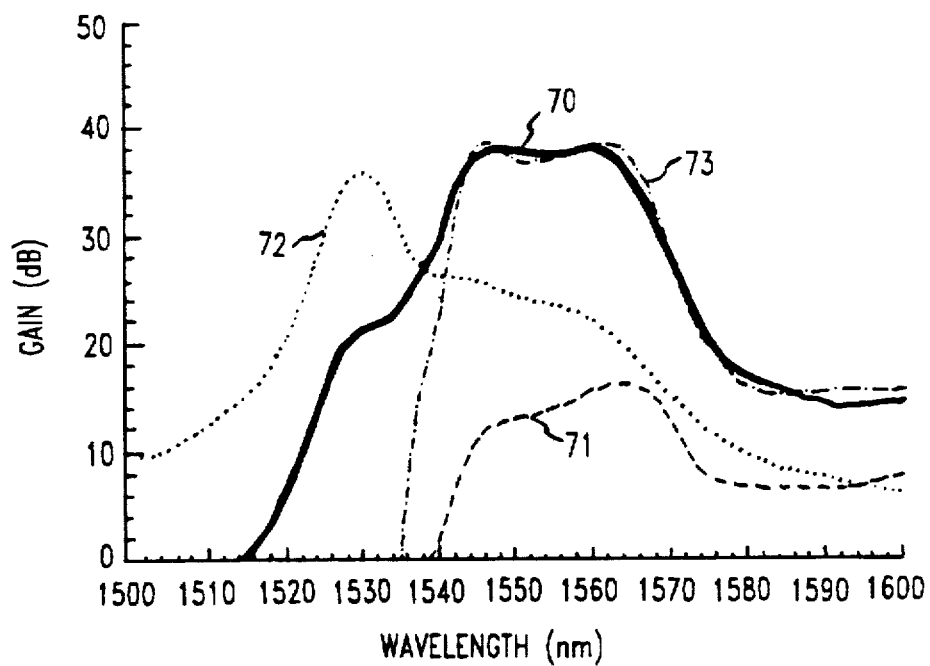
FIGS. 7–9 show further gain spectra.

FIG. 7 shows further calculated exemplary gain spectra. Numeral 72 refers to the spectrum of 15 m of the first fiber, 98% inverted, numeral 71 to the spectrum of a 9 m of the second fiber, 48% inverted, numeral 70 to the spectrum of the combination of the two fibers, and numeral 73 to the best spectrum of the second fiber alone ( 18.6 m, 51% inverted).

As suggested by the above exemplary results, it is typically desirable to highly pump the input stage of a multistage amplifier according to the invention, exemplarily such that substantially complete inversion is attained. At high inversion the input stage can have advantageously low NF, exemplarily <4 dB (excluding losses due to components such as isolators, WDMs, pump reflectors and splices).

In a multistage EDFA the input power to the output stage frequently is high enough to substantially saturate the gain of the output stage and reduce the output stage inversion to about 50%, substantially as suggested by the calculated results. Thus, the above describe first and second fibers are possible choices for a substantially optimized multistage EDFA according to the invention. Such a design can have advantageously low NF and high power output, especially if the output stage is pumped with high intensity radiation of about 1064 nm wavelength.

Figure 9:
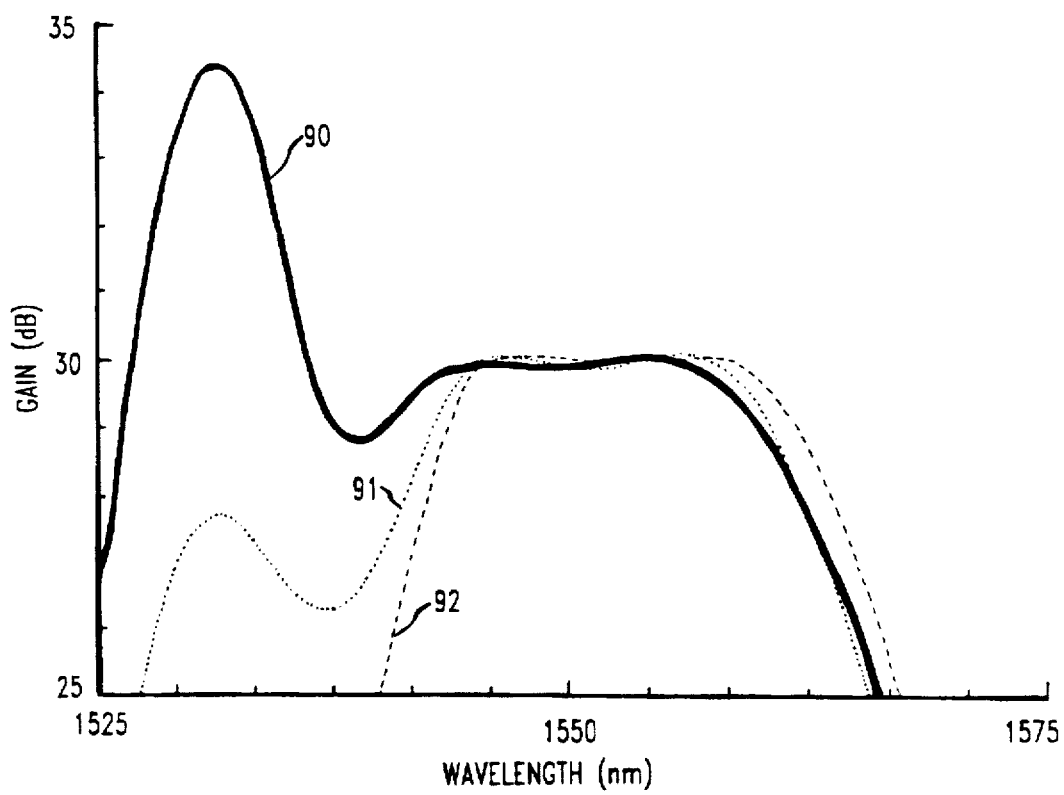

FIG. 9 shows the flattest gain spectra obtainable for different 2-stage 30-dB EDFAs. Curve 90 pertains to an amplifier having the same Al-doped EDF (6.4% Al) in both stages. Curve 91 pertains to an amplifier having Al-doped EDF in the input stage Yb and P-doped EDF in the output stage; and curve 92 pertains to an amplifier according to the invention, with Al-doped EDF in the input stage and Yb and P-doped EDF in the output stage. As will be recognized, the flat spectral region of the EDFA according to the invention is shifted upward in wavelength, as compared to the prior art EDFA (91). This desirable feature enables placement of a channel at longer wavelengths, where the NF is lower than at shorter wavelengths. Furthermore, it will be recognized that the EDFA according to the invention has flatter gain over a wider spectral region than does the prior art EDFA (91).

Figure 6:
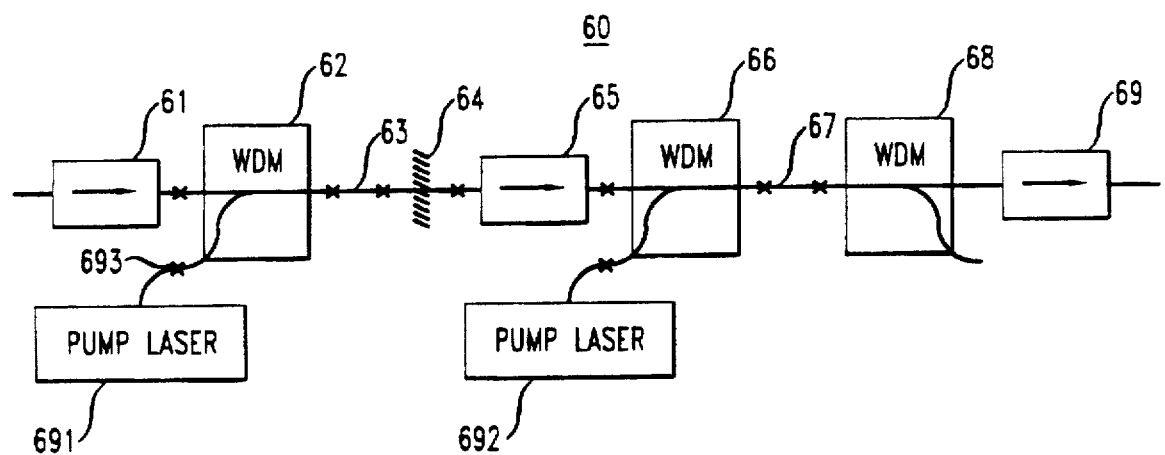
FIG. 6 schematically depicts an exemplary 2-stage EDFA according to the invention.

FIG. 6 schematically depicts an exemplary 2-stage EDFA (60) according to the invention. Input radiation (e.g., about 1550 nm radiation) is provided to optional optical isolator 61 and propagates through wavelength-dependent coupler 62 (typically referred to as a "WDM") to first EDF 63. Pump radiation (e.g., 980 nm radiation from a known laser diode 691) is also provided to WDM 62 and also propagates to EDF 63. The signal radiation is amplified in EDF 63, and propagates through (optional) pump radiation reflector 64 and (optional) optical isolator 65 to WDM 66 and second EDF 67. Radiation from pump laser 692 (e.g., a known Nd-doped fiber laser emitting 1064 nm radiation) is coupled into the second EDF by means of WDM 66. Finally amplified signal radiation propagates through (optional) WDM 68 and (optional) optical isolator 69 and is available for coupling into a conventional optical fiber or for provision to other conventional utilization means, e.g., a multi-channel splitter. Optional WDM 68 serves to remove remnant pump power from the signal path. The "X" symbols (e.g., 693) indicate in conventional fashion fiber connections, typically fused fiber splices.

Those skilled in the art will appreciate that the invention can be embodied in amplifiers having a variety of configurations. For instance, a variety of pumping arrangements can be used, including co-propagating, counter-propagating and dual-propagating (co- and counter-propagating) pump radiation in either or both stages. Furthermore, all pump wavelengths useful for the first EDF (e.g., 950–1000 nm, typically about 980 nm; 1450–1500 nm, typically about 1480 nm), and all pump wavelengths useful for the second EDF (e.g., 900–1100 nm, exemplarily about 980 or 1064 nm; 1450–1500 nm) are contemplated.

Still furthermore, the above described approach can readily be extended to multistage amplifiers having more than two stages, e.g., to a multistage amplifier having two first fiber stages and one second fiber stage, to one having one first fiber stage and two second fiber stages, or to one having two first fiber stages and two second fiber stages.

Passive components such as filters, isolators or WDMs can be incorporated into a multistage amplifier according to the invention in any desired way, in accordance with specific performance requirements. For instance, there need not be any passive component between the first fiber and the second fiber, and two dissimilar fibers could be directly jointed together.

It should also be understood that amplifiers according to the invention can be operated at inversion levels other than the above discussed levels, as well as at all desired input power levels and output power levels. However, in currently preferred embodiments the first fiber is pumped such that the inversion level is above 50%, and the second fiber is pumped such that the inversion level is in the range 25–75%.

Figure 11:
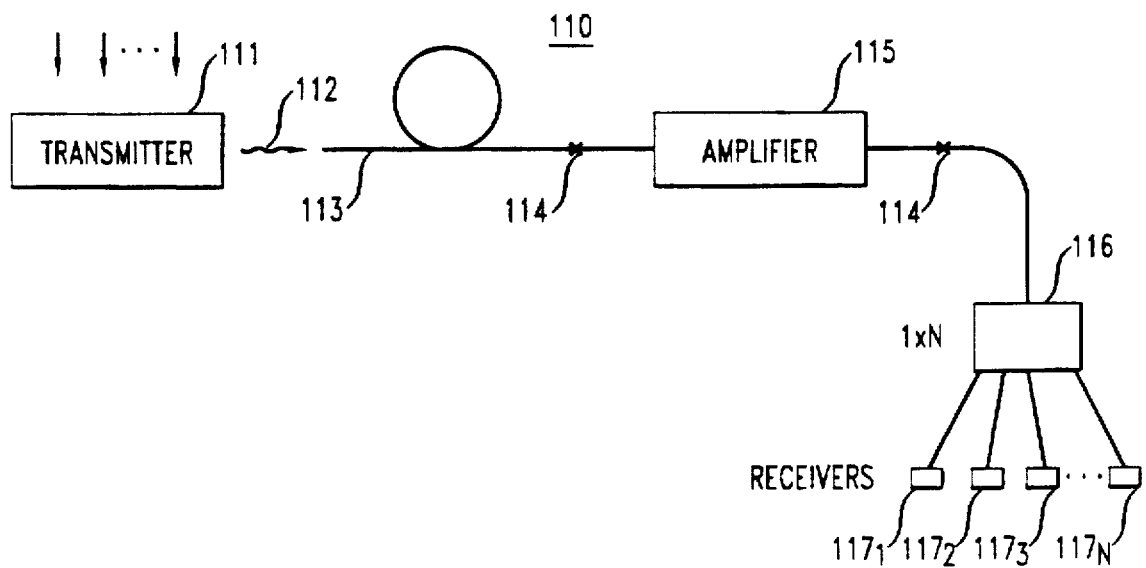
FIG. 11 schematically depicts an exemplary optical fiber communication system according to the invention.

FIG. 11 schematically depicts an exemplary optical fiber communication system (110) according to the invention, more specifically, an analog CATV system. In FIG. 11, reference numerals 111–114 refer, respectively, to a transmitter (receiving n electrical inputs that are used to amplitude-modulate the output of a laser), the optical output of the transmitter, a length of conventional optical fiber, and a conventional fiber joint, e.g., a fusion splice. Multistage amplifier 115 exemplarily is a 2-stage amplifier substantially as shown in FIG. 6, and 1×N splitter 116 divides the amplified signal into N signals which are distributed to N receivers 1171–117N, respectively.

EXAMPLE 1

A 2-stage optical fiber amplifier, substantially as shown in FIG. 6, was assembled. The input stage contained 15 m of the above-described first fiber, and the output stage contained 9 m of the above-described second fiber. The first fiber was pumped with 100 mW of 980 nm radiation from a conventional single stripe laser diode. A known pump reflector was provided to enhance inversion of the Er ions in the first fiber. A conventional optical isolator was placed between the two stages to suppress backward-traveling amplified spontaneous emission. The total component loss was about 6dB, with a slope of about 0.05 dB/nm. Because of the wavelength dependence of the total component loss the inversion in the second fiber was somewhat reduced, with consequent reduction of output power.

To test the performance of the exemplary 2-stage amplifier, a saturating tone was provided at 1548 nm, and its power adjusted to various levels. A small probe signal was added and swept across the spectrum to measure gain. For each saturating tone level, the pump power of the output stage was adjusted until the flattest spectrum was achieved. Exemplary results are shown in FIG. 8.

Figure 8:
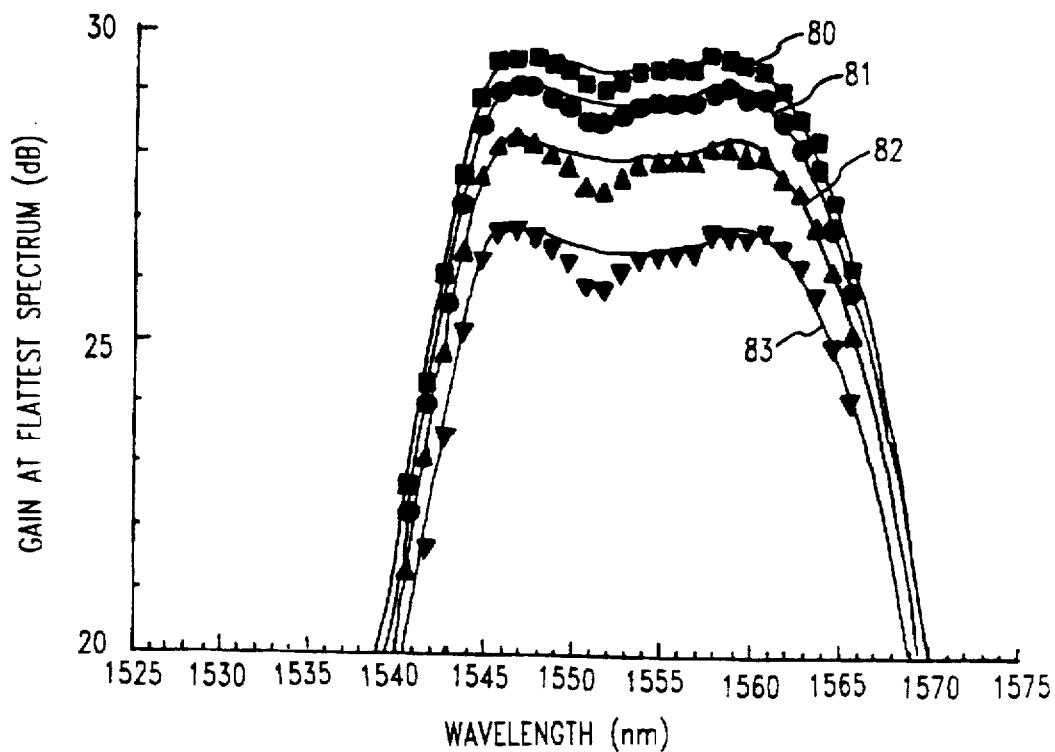

All four spectra of FIG. 8 achieved more than 17 nm bandwidth, with as little as 0.4 dB variation in one case. The 1064 nm output stage pump power levels for these cases were 307, 425, 645 and 1024 mW for −15, −11, −7 and −3 dBm signal inputs, respectively, corresponding to curves 80–83, respectively. The measured output power at 1548 nm was 14.53, 18.01, 21.06 and 23.61 of dBm for −15, −11, −7 and −3 dBm signals, respectively.

Figure 10:
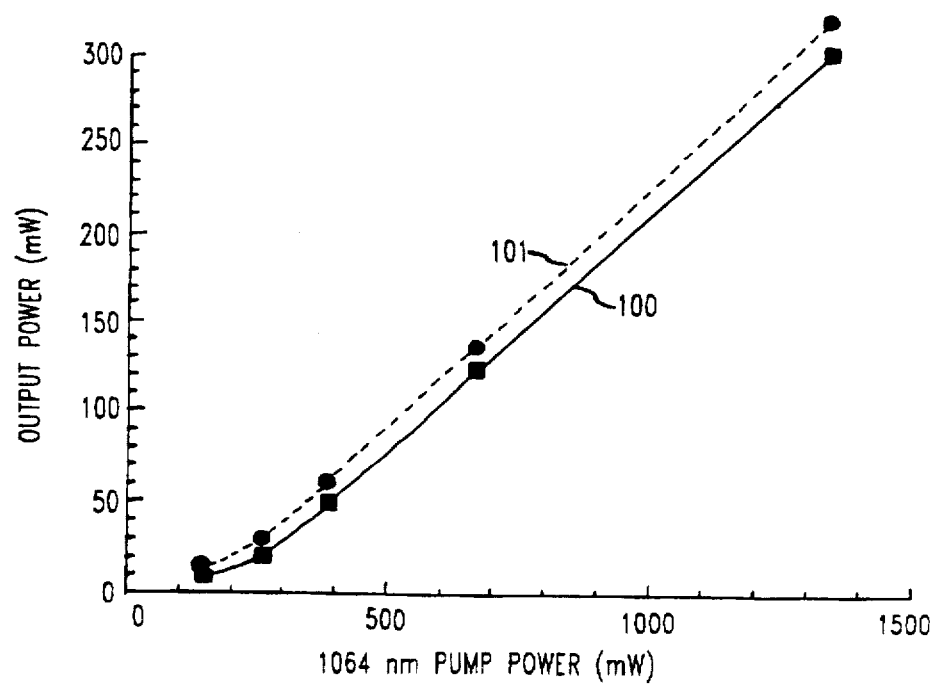
FIG. 10 shows data on output power vs. 1064 nm pump power.

We also measured output power at 1548 nm vs. output stage pump power, for two signal levels that straddle the four signal powers recited above. FIG. 10 shows exemplary results, with curves 100 and 101 pertaining to −17 and −1 dBm, respectively. As can be seen, the output power varies only slightly, indicative of a highly saturated amplifier.

EXAMPLE 2

In a 2-stage amplifier as described above, the second fiber was lengthened to 12 m, and optimized for flatness substantially as described. When optimized, the output power increased by 5.4 dB for all signal levels to 19.93, 23.41, 26.46 dBm for −15, −11, −7 dBm signals, respectively. In all cases, the flatness was slightly worse than shown in FIG. 7, with the variation increasing by about 0.3 dB across the 17 nm spectral range.

The NF of multistage amplifiers according to the invention is substantially determined by the NF of the input stage. Including pre-amplifier loss, the NF at 1548 nm of the 2-stage amplifier of Example 1 was under 5 dB for all cases, with a minimum of about 4.2 dB for the smallest signal case.

The invention claimed is:

1. Article comprising a multistage fiber amplifier comprising an input stage and an output stage, said input stage comprising a first silica-based amplifier fiber that comprises Er and Al; said output stage comprising a second silica-based amplifier fiber that comprises Er; the multistage optical fiber amplifier furthermore comprising one or more radiation sources for providing pump radiation to said first and second amplifier fibers;

CHARACTERIZED IN THAT
a) the second amplifier fiber further comprises Yb, and still further comprises one or both of Al and P, with the Yb concentration selected such that the Yb:Er ratio is greater than 5:1;
b) the first and second amplifier fibers are selected such that the multistage fiber amplifier has a gain spectrum that is substantially flat over a spectral range of at least 15 nm that extends beyond 1560 nm; and
c) a radiation source for providing pump radiation to the first amplifier fiber is selected to provide more than 50% inversion of Er-ions in the first amplifier fiber, and a radiation source for providing pump radiation to the second amplifier is selected to provide between 25 and 75% inversion of Er-ions in the second amplifier fiber.

2. Article according to claim 1, wherein the article is an optical fiber communication system comprising optical transmitter means, optical receiver means and an optical fiber transmission path signal—transmissively connecting said transmission means and receiver means, said optical fiber transmission path comprising said multistage amplifier.

* * * * *